US009169787B2

(12) United States Patent
Brennan (10) Patent No.: US 9,169,787 B2
(45) Date of Patent: Oct. 27, 2015

(54) VALVE CONTROL SYSTEMS AND METHODS FOR CYLINDER DEACTIVATION AND ACTIVATION TRANSITIONS

(75) Inventor: Daniel G. Brennan, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 692 days.

(21) Appl. No.: 13/477,700

(22) Filed: May 22, 2012

(65) Prior Publication Data

US 2013/0317725 A1   Nov. 28, 2013

(51) Int. Cl.
*F02D 41/00* (2006.01)
*F02D 13/06* (2006.01)
*F02D 17/02* (2006.01)
*F02D 37/02* (2006.01)

(52) U.S. Cl.
CPC ............... *F02D 13/06* (2013.01); *F02D 17/02* (2013.01); *F02D 41/0002* (2013.01); *F02D 41/0087* (2013.01); *F02D 37/02* (2013.01); *F02D 2041/001* (2013.01); *F02D 2250/18* (2013.01); *Y02T 10/18* (2013.01); *Y02T 10/42* (2013.01)

(58) Field of Classification Search
CPC ..... F02D 41/0087; F02D 17/02; F02D 13/06; F02D 2041/0012; F02D 41/0002; Y02T 10/18; Y02T 10/42; F01L 13/0005; F01L 1/34; F01L 2013/001; F01L 9/04; F01L 13/0036; F01L 1/2405; F01L 2820/032
USPC ....... 123/198 F, 198 DB, 481, 491, 492, 493; 701/101, 102, 104, 105, 112
See application file for complete search history.

(56) References Cited

U.S. PATENT DOCUMENTS

| 1,703,858 A | 3/1929 | Banner |
| 3,157,166 A | 11/1964 | MacNeill |
| 3,926,159 A | 12/1975 | Michelson et al. |
| 4,000,756 A | 1/1977 | Ule et al. |
| 4,009,695 A | 3/1977 | Ule |
| 4,044,652 A | 8/1977 | Lewis et al. |
| 4,459,946 A | 7/1984 | Burandt |
| 4,807,517 A | 2/1989 | Daeschner |
| 5,267,541 A | 12/1993 | Taguchi et al. |
| 5,373,818 A | 12/1994 | Unger |

(Continued)

FOREIGN PATENT DOCUMENTS

| CN | 1847627 A | 10/2006 |
| CN | 101576016 A | 11/2009 |
| CN | 101806252 A | 8/2010 |

OTHER PUBLICATIONS

U.S. Appl. No. 12/910,212, filed Oct. 22, 2010, Brennan et al.

*Primary Examiner* — Hai Huynh
*Assistant Examiner* — Raza Najmuddin (57) ABSTRACT

An engine control system for a vehicle includes an air control module and a valve control module. The air control module determines a desired mass of air per cylinder (APC) based on a torque request and selectively increases the desired APC in response to a command to deactivate N cylinders of an engine. The valve control module disables intake and exhaust valves of the N cylinders of the engine in response to the command, determines intake and exhaust valve timing based on the desired APC, and controls camless intake and exhaust valve actuators of M other cylinders based on the intake and exhaust valve timing, respectively. The engine includes Q cylinders, M and N are integers greater than zero, and M plus N equals Q.

18 Claims, 5 Drawing Sheets

(56) References Cited

U.S. PATENT DOCUMENTS

| | | |
|---|---|---|
| 5,421,545 A | 6/1995 | Schexnayder |
| 5,546,222 A | 8/1996 | Plaessmann et al. |
| 5,572,961 A | 11/1996 | Schechter et al. |
| 5,638,781 A | 6/1997 | Sturman |
| 5,881,689 A | 3/1999 | Hochholzer |
| 6,109,284 A | 8/2000 | Johnson et al. |
| 6,112,711 A | 9/2000 | Shimizu et al. |
| 6,263,842 B1 | 7/2001 | De Ojeda et al. |
| 6,374,784 B1 | 4/2002 | Tischer et al. |
| 6,505,584 B2 | 1/2003 | Lou |
| 6,688,267 B1 | 2/2004 | Raghavan |
| 6,691,652 B2 | 2/2004 | Kammerdiener et al. |
| 6,739,293 B2 | 5/2004 | Turner et al. |
| 6,748,916 B2 | 6/2004 | Schaefer-Siebert |
| 6,810,844 B2 | 11/2004 | Sellnau |
| 6,868,811 B2 | 3/2005 | Koro et al. |
| 6,886,510 B2 | 5/2005 | Sun et al. |
| 6,966,287 B1 | 11/2005 | Livshiz et al. |
| 6,981,475 B2 | 1/2006 | Turquis |
| 7,025,326 B2 | 4/2006 | Lammert et al. |
| 7,278,392 B2 | 10/2007 | Zillmer et al. |
| 7,580,779 B2 | 8/2009 | Zillmer et al. |
| 7,644,688 B2 | 1/2010 | Marriott et al. |
| 7,685,976 B2 | 3/2010 | Marriott |
| 7,748,353 B2 | 7/2010 | Russell et al. |
| 8,171,900 B2 | 5/2012 | Cowgill |
| 8,224,537 B2 | 7/2012 | Olsson et al. |
| 8,347,836 B2 | 1/2013 | Leone et al. |
| 8,386,150 B2 * | 2/2013 | Whitney et al. ............... 701/103 |
| 8,494,742 B2 | 7/2013 | Nanua |
| 8,602,002 B2 | 12/2013 | Brennan |
| 2002/0177939 A1 | 11/2002 | Kabasin |
| 2003/0015155 A1 | 1/2003 | Turner et al. |
| 2003/0062019 A1 | 4/2003 | Schaefer-Siebert |
| 2003/0172885 A1 | 9/2003 | Gaessler et al. |
| 2006/0144356 A1 | 7/2006 | Sellnau et al. |
| 2006/0169231 A1 | 8/2006 | Fuwa |
| 2007/0006831 A1 | 1/2007 | Leone et al. |
| 2007/0256651 A1 | 11/2007 | Marriott et al. |
| 2008/0173264 A1 | 7/2008 | Sun |
| 2009/0007866 A1 | 1/2009 | Nakamura |
| 2009/0014672 A1 | 1/2009 | Schiemann |
| 2009/0070016 A1 | 3/2009 | Rayl |
| 2009/0118977 A1 * | 5/2009 | Whitney et al. ............... 701/103 |
| 2009/0173314 A1 * | 7/2009 | Whitney et al. ............... 123/350 |
| 2009/0229562 A1 | 9/2009 | Ramappan et al. |
| 2009/0229563 A1 | 9/2009 | Rayl et al. |
| 2009/0277407 A1 | 11/2009 | Ezaki |
| 2009/0283070 A1 * | 11/2009 | Whitney et al. ........... 123/339.11 |
| 2010/0192925 A1 | 8/2010 | Sadakane |
| 2010/0211297 A1 * | 8/2010 | Doering et al. ............... 701/112 |
| 2010/0307433 A1 | 12/2010 | Rust et al. |
| 2011/0073069 A1 * | 3/2011 | Marriott et al. ........... 123/406.12 |
| 2011/0139117 A1 * | 6/2011 | Kar et al. ....................... 123/395 |
| 2011/0144894 A1 | 6/2011 | Marriott et al. |
| 2011/0197833 A1 | 8/2011 | Vorih et al. |
| 2012/0031373 A1 | 2/2012 | Brennan |
| 2012/0097121 A1 | 4/2012 | Brennan et al. |
| 2012/0168654 A1 | 7/2012 | Marriott |
| 2013/0261935 A1 * | 10/2013 | Jankovic ....................... 701/104 |
| 2014/0039776 A1 * | 2/2014 | Cowgill ......................... 701/102 |
| 2014/0041624 A1 * | 2/2014 | Rayl et al. ..................... 123/348 |

\* cited by examiner

VALVE CONTROL SYSTEMS AND METHODS FOR CYLINDER DEACTIVATION AND ACTIVATION TRANSITIONS

FIELD

The present disclosure relates to internal combustion engines and more particularly to valve control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve and/or engine valve timing controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The driver inputs may include, for example, accelerator pedal position, brake pedal position, and/or one or more other suitable driver inputs. The other inputs may include, for example, cylinder pressure measured using a cylinder pressure sensor, one or more variables determined based on the measured cylinder pressure, and/or one or more other suitable values.

SUMMARY

An engine control system for a vehicle includes an air control module and a valve control module. The air control module determines a desired mass of air per cylinder (APC) based on a torque request and selectively increases the desired APC in response to a command to deactivate N cylinders of an engine. The valve control module disables intake and exhaust valves of the N cylinders of the engine in response to the command, determines intake and exhaust valve timing based on the desired APC, and controls camless intake and exhaust valve actuators of M other cylinders based on the intake and exhaust valve timing, respectively. The engine includes Q cylinders, M and N are integers greater than zero, and M plus N equals Q.

An engine control method for a vehicle includes: determining a desired mass of air per cylinder (APC) based on a torque request; selectively increasing the desired APC in response to a command to deactivate N cylinders of an engine; disabling intake and exhaust valves of the N cylinders of the engine in response to the command; determining intake and exhaust valve timing based on the desired APC; and controlling camless intake and exhaust valve actuators of M other cylinders based on the intake and exhaust valve timing, respectively. The engine includes Q cylinders, M and N are integers greater than zero, and M plus N equals Q.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine combusts a mixture of air and fuel within cylinders to generate drive torque. A throttle valve regulates airflow into the engine. Fuel is injected by fuel injectors. Spark plugs generate spark within the cylinders to initiate combustion. Intake and exhaust valves of a cylinder are controlled to regulate airflow into the cylinder and exhaust flow out of the cylinder. Traditionally, opening of the intake and exhaust valves of the cylinder is controlled by one or more camshafts.

Using a camless, fully flexible valve actuation (FFVA) system, opening of valves of the engine can be controlled independently of each other. For example, an engine control module (ECM) can control opening of an intake valve of a cylinder separately from an exhaust valve of the cylinder. The ECM can also control opening of the intake valve of the cylinder separately from intake valves of other cylinders.

Under some circumstances, the ECM may deactivate one or more cylinders (e.g., half) of the engine. For example only, the ECM may deactivate cylinders at times when fuel consumption can be reduced and a requested amount of torque can be produced by the remaining cylinders. When a cylinder is deactivated, opening of the cylinder's intake and exhaust valves is disabled and fuel is cutoff from the cylinder.

Before deactivating one or more cylinders, the ECM could open the throttle valve to increase airflow into the cylinders of the engine. The ECM retards spark timing (from a calibrated spark timing) as airflow into the cylinders increases to prevent an increase in engine torque output. The ECM may selectively deactivate cylinders once airflow into the cylinders is sufficient for operation with only the remaining (non-deactivated) cylinders once the one or more cylinders are deactivated. The ECM may advance spark timing for active cylinders as the cylinders are deactivated to prevent a decrease in engine torque output as the cylinders are deactivated. However, fuel may be unnecessarily consumed when deactivating cylinders in this way due to the airflow increase. Deactivating cylinders in this way may also cause fluctuations in the engine torque output.

The ECM of the present disclosure utilizes the ability provided by the FFVA system to control the valves of the engine independently when deactivating one or more cylinders and when re-activating one or more cylinders. When deactivating one or more cylinders, the ECM increases intake valve duration for the remaining cylinders (relative to intake valve duration before the deactivation) as cylinders are deactivated to increase airflow into the remaining cylinders.

When re-activating one or more cylinders, the ECM increases intake valve opening duration for cylinders that are being re-activated relative to intake valve duration for cylinders that were already active. One or more combustion characteristics (e.g., torque production) of re-activated cylinders may be poorer than combustion characteristics of the cylinders that were active prior to the re-activation. Increasing intake valve opening duration of re-activated cylinders may increase airflow into, the re-activated cylinders. This may improve the combustion characteristics of the re-activated cylinders to the level of the combustion characteristics of the cylinders that were active prior to the re-activation. Deactivating and re-activating cylinders in this way may enable spark timing to be maintained at the calibrated spark timing, may provide a fuel consumption savings, and may provide a smoother engine torque output during transitions.

Figure 1:
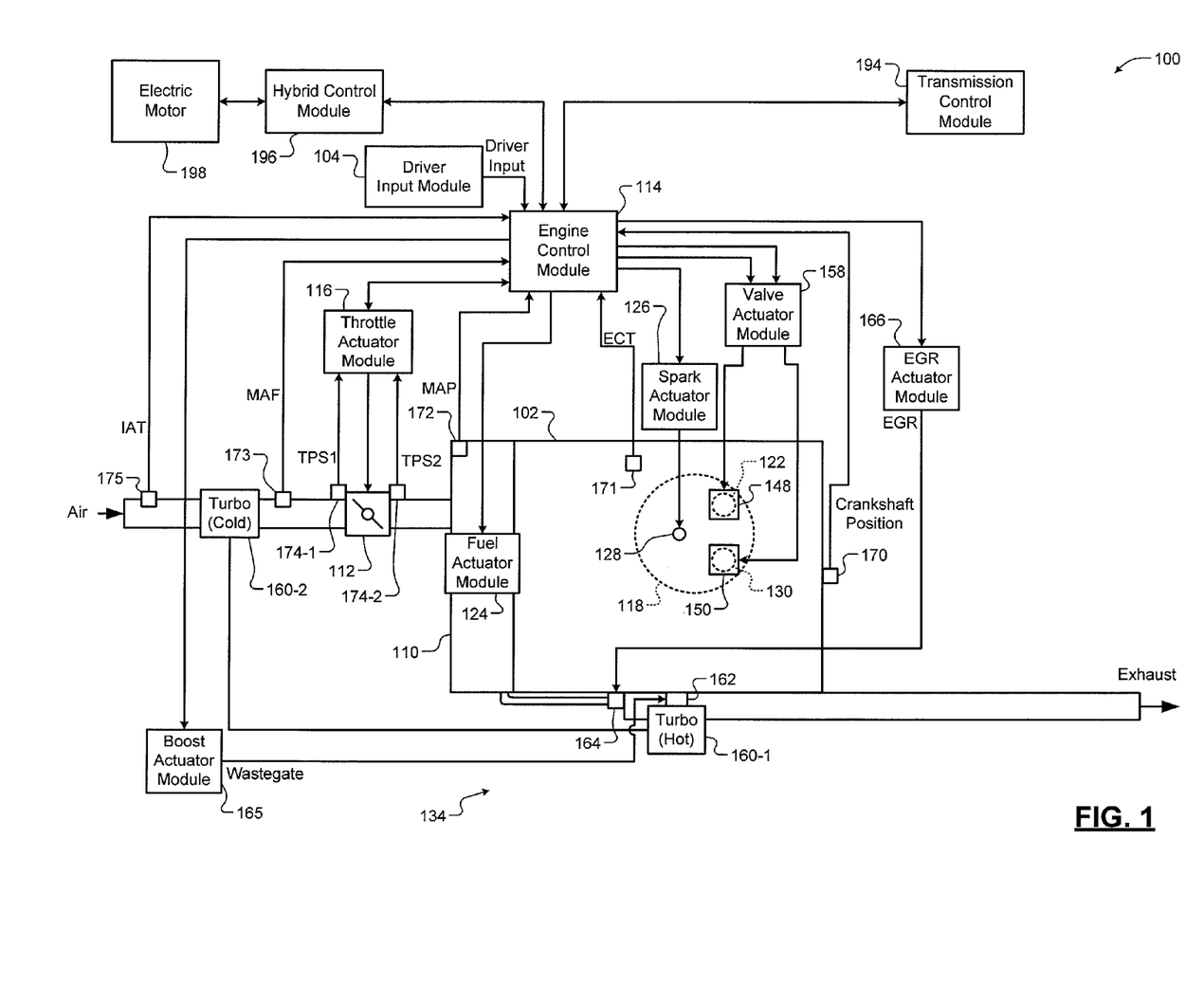
FIG. 1 is a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control the amount of air drawn into the intake manifold 110.

Air from the intake manifold 110 is drawn into cylinders of the engine 102. While the engine 102 may include more than one cylinder, for illustration purposes a single representative cylinder 118 is shown. The engine 102 may operate using a four-stroke cycle. The four strokes, described below, are may be named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle.

Generating spark may be referred to as a firing event. The spark actuator module 126 may have the ability to vary the timing of the spark for each firing event. The spark actuator module 126 may even be capable of varying the spark timing for a next firing event when the spark timing is changed between a last firing event and the next firing event.

During the combustion stroke, the combustion of the air/fuel mixture drives the piston away from TDC, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through one or more exhaust valves, such as exhaust valve 130. The byproducts of combustion are exhausted from the vehicle via an exhaust system 134.

An intake valve actuator 148 controls actuation of the intake valve 122. An exhaust valve actuator 150 controls actuation of the exhaust valve 130. A valve actuator module 158 controls the intake and exhaust valve actuators 148 and 150 based on signals from the ECM 114. The intake and exhaust valve actuators 148 and 150 control opening and closing of the intake and exhaust valves 122 and 130, respectively, without one or more camshafts. The intake and exhaust valve actuators 148 and 150 may include, for example, electro-hydraulic actuators, electro-mechanical actuators, or another suitable type of camless valve actuator. Camless intake and exhaust valve actuators enable actuation of each intake valve and exhaust valve of the engine to be controlled independently. The intake and exhaust valve actuators provide what may be referred to as fully flexible valve actuation (FFVA).

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 165. The boost actuator module 165 may modulate the boost of the turbocharger by controlling the position of the wastegate 162. In various implementations, multiple turbochargers may be controlled by the boost actuator module 165. The turbocharger may have variable geometry, which may be controlled by the boost actuator module 165.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 164, which selectively redirects exhaust gas back to the intake manifold 110. The EGR valve 164 may be located upstream of the turbocharger's turbine 160-1. An EGR actuator module 166 may control the EGR valve 164 based on signals from the ECM 114.

Position of the crankshaft may be measured using a crankshaft position sensor 170. Engine speed, engine acceleration, and/or one or more other parameters may be determined based on the crankshaft position. A temperature of the engine coolant may be measured using an engine coolant temperature (ECT) sensor 171. The ECT sensor 171 may be located within the engine 102 or at other locations where the coolant is circulated, such as a radiator (not shown).

A pressure within the intake manifold 110 may be measured using a manifold absolute pressure (MAP) sensor 172. In various implementations, engine vacuum, which is the difference between ambient air pressure and the pressure within the intake manifold 110, may be measured. A mass flowrate of air flowing into the intake manifold 110 may be measured using a mass air flowrate (MAF) sensor 173. In various implementations, the MAF sensor 173 may be located in a housing that also includes the throttle valve 112.

The throttle actuator module 116 may monitor position of the throttle valve 112 using one or more throttle position sensors (TPS) 174. For example, first and second throttle position sensors 174-1 and 174-2 monitor position of the throttle valve 112 and generate first and second throttle positions (TPS1 and TPS2), respectively, based on the throttle position. A temperature of air being drawn into the engine 102 may be measured using an intake air temperature (IAT) sensor 175. The ECM 114 may use signals from the sensors and/or one or more other sensors to make control decisions for the engine system 100.

A transmission control module 194 may control operation of the transmission. The ECM 114 may communicate with the transmission control module 194 for various reasons, such as to share parameters and to coordinate engine operation with operation of the transmission. For example, the ECM 114 may selectively reduce engine torque during a gear shift. The ECM 114 may communicate with a hybrid control module 196 to coordinate operation of the engine 102 and an electric motor 198.

The electric motor 198 may also function as a generator and may be used to produce electrical energy for use by vehicle electrical systems and/or for storage in a battery. The electric motor 198 may also function as a motor and may be used, for example, to supplement or replace engine torque output. In various implementations, various functions of the ECM 114, the transmission control module 194, and the hybrid control module 196 may be integrated into one or more modules.

Each system that varies an engine parameter may be referred to as an actuator. Each actuator receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the fuel actuator module 124, the valve actuator module 158, the boost actuator module 165, and the EGR actuator module 166. For these actuators, the actuator values may correspond to a number of activated cylinders, fueling rate, intake and exhaust valve timing, boost pressure, and EGR valve opening area, respectively. The ECM 114 may control actuator values in order to cause the engine 102 to generate a desired engine output torque.

Figure 2:
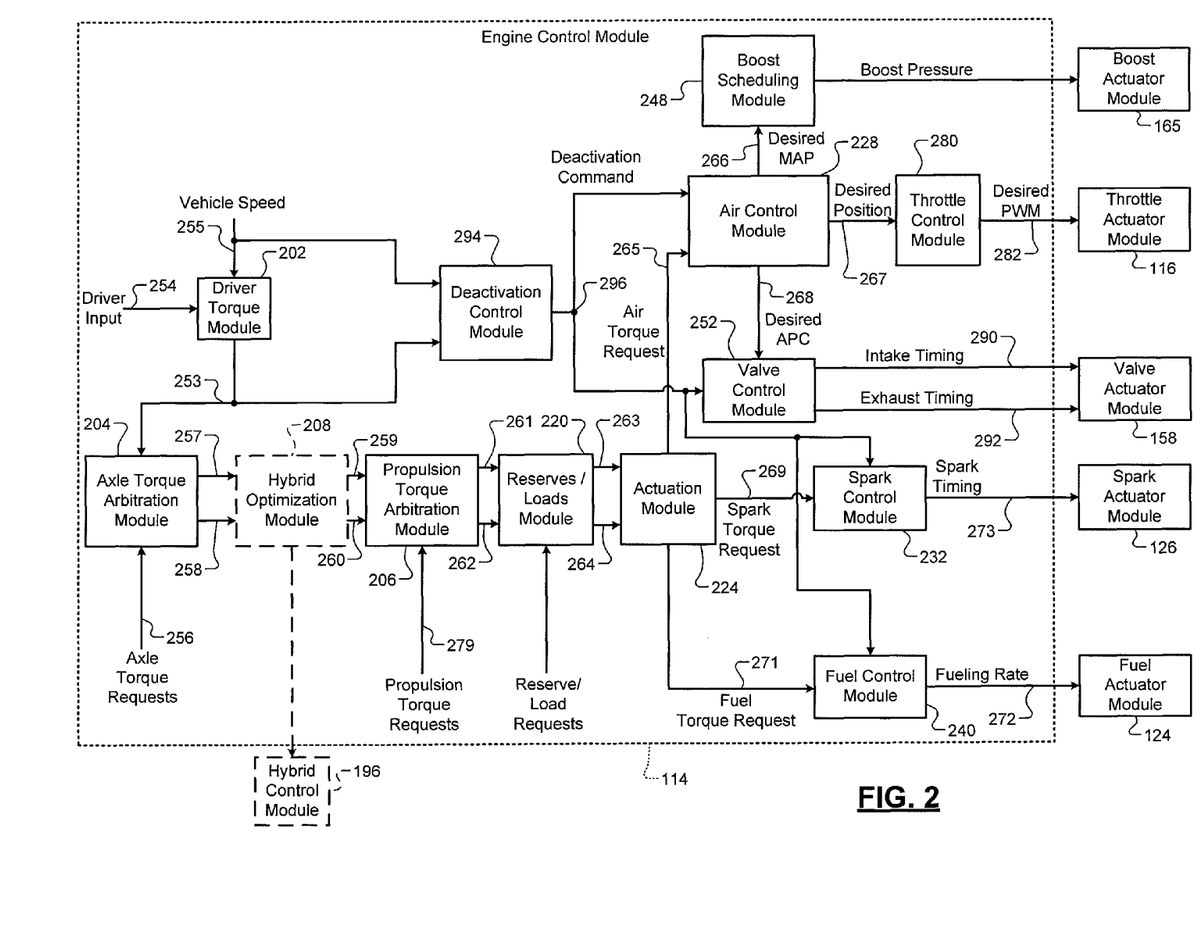
FIG. 2 is a functional block diagram of an example engine control system according to the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The example implementation of the ECM 114 also includes a reserves/loads module 220, an actuation module 224, an air control module 228, a spark control module 232, and a fuel control module 240. The example implementation of the ECM 114 also includes a boost scheduling module 248 and a valve control module 252.

The driver torque module 202 may determine a driver torque request 253 (e.g., newton meters, Nm) based on driver input 254 from the driver input module 104. The driver input 254 may be based on, for example, a position of an accelerator pedal and a position of a brake pedal. The driver input 254 may also be based on inputs from a cruise control system, which may be an adaptive cruise control system. Adaptive cruise control systems vary vehicle speed to maintain a predetermined following distance.

The driver torque module 202 may determine the driver torque request 253 further based on a vehicle speed 255. For example only, the vehicle speed 255 may be generated based on one or more measured wheel speeds, a transmission output shaft speed, and/or one or more other suitable parameters.

An axle torque arbitration module 204 arbitrates between the driver torque request 253 and other axle torque requests 256. Axle torque (torque to the wheels) may be produced by various sources including an engine and/or an electric motor. The axle torque arbitration module 204 outputs a predicted torque request 257 (e.g., in Nm) and an immediate torque request 258 (e.g., in Nm) based on the results of the arbitration between the driver and axle torque requests 253 and 256. As described below, the predicted and immediate torque requests 257 and 258 from the axle torque arbitration module 204 may selectively be adjusted by other modules of the ECM 114 before being used to control actuators of the engine system 100.

In general terms, the immediate torque request 258 is the amount of currently desired axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the actuator values to allow a faster transition to the predicted torque request 257, while still maintaining the axle torque at the immediate torque request 258.

In various implementations, the predicted torque request 257 may be based on the driver torque request 253. The immediate torque request 258 may be less than the predicted torque request 257, such as when the driver torque request 253 is causing wheel slip on an icy surface. In such a case, a traction control system (not shown) may request a reduction via the immediate torque request 258, and the ECM 114 reduces the torque produced by the engine system 100 to the immediate torque request 258. However, the ECM 114 controls the engine system 100 so that the engine system 100 can quickly resume producing the predicted torque request 257 once the wheel slip stops.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260 (e.g., in Nm), respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 279 and the converted predicted and immediate torque requests. The propulsion torque arbitration module 206 generates an arbitrated predicted torque request 261 (e.g., in Nm) and an arbitrated immediate torque request 262 (e.g., in Nm). The arbitrated torque requests 261 and 262 may be generated by selecting a winning request from among received torque requests. Alternatively or additionally, the arbitrated torque requests 261 and 262 may be generated by modifying one of the received requests based on another one or more of the received torque requests.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 (e.g., in Nm) to the actuation module 224.

In general terms, the difference between the adjusted immediate torque request 264 and the (generally higher) adjusted predicted torque request 263 can be referred to as a torque reserve (e.g., in Nm). The torque reserve may represent the amount of additional torque (above the adjusted immediate torque request 264) that the engine system 100 can begin to produce with minimal delay. The torque reserve can absorb sudden increases in required torque. For example only, sudden loads imposed by an air conditioner or a power steering pump may be counteracted by using all or a part of the torque reserve by increasing the adjusted immediate torque request 264.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the adjusted immediate torque request 264 while maintaining the values of the slow actuators.

The reserves/loads module 220 may also create or increase a torque reserve in anticipation of a future load, such as power steering pump operation or engagement of an air conditioning (A/C) compressor clutch. The torque reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The actuation module 224 receives the adjusted predicted and immediate torque requests 263 and 264. The actuation module 224 determines how the adjusted predicted and immediate torque requests 263 and 264 will be achieved. In various implementations, the actuation module 224 may generate an air torque request 265 (e.g., in Nm) based on the adjusted predicted torque request 263. The air torque request 265 may be set equal to the adjusted predicted torque request 263, setting air flow so that the adjusted predicted torque request 263 can be achieved by changes to other actuators.

The air control module 228 determines desired actuator values based on the air torque request 265. For example only, the air control module 228 may determine a desired manifold absolute pressure (MAP) 266, a desired throttle position 267, and/or a desired mass of air per cylinder (APC) 268 based on the air torque request 265.

The actuation module 224 may also generate a spark torque request 269 and a fuel torque request 271. The actuation module 224 may generate the spark torque request 269 and the fuel torque request 271 based on the adjusted immediate torque request 264. The spark torque request 269 may be used by the spark control module 232 to determine how much, if any, to retard the spark timing from a calibrated spark timing. The calibrated spark timing may vary based on various engine operating conditions.

For example only, a torque relationship may be inverted to solve for a desired spark timing 273. For a given torque request ($T_{Des}$), the desired spark timing ($S_{Des}$) 273 may be determined based on:

$$S_{Des}=T^{-1}(T_{Des},APC,I,E,AF,OT,\#). \tag{1}$$

where APC is air per cylinder, I is intake valve timing, E is exhaust valve timing, AF is air/fuel ratio, OT is oil temperature, and # is a number of activated cylinders. Additional variables may also be accounted for, such as the degree of opening of an exhaust gas recirculation (EGR) valve. This relationship may be embodied as an equation and/or as a lookup table.

When the spark advance is set to the calibrated spark timing, the resulting torque may be as close to a maximum best torque (MBT) as possible. MBT refers to the maximum engine output torque that is generated for a given air flow as spark advance is increased, while using fuel having an octane rating greater than a predetermined octane rating and using stoichiometric fueling. The spark advance at which this maximum torque occurs is referred to as an MBT spark timing. The calibrated spark timing may differ slightly from MBT spark timing because of, for example, fuel quality (such as when lower octane fuel is used) and environmental factors. The engine output torque at the calibrated spark timing may therefore be less than MBT.

The fuel control module 240 may control the amount of fuel provided to the cylinders based on the fuel torque request 271. During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a fuel mass that will yield stoichiometric combustion when combined with the current APC. The fuel control module 240 may instruct the fuel actuator module 124 via a fueling rate 272 to inject this fuel mass for each activated cylinder.

The air control module 228 may determine the desired throttle position 267 based on the air torque request 265. The air control module 228 may output the desired throttle position 267 to a throttle control module 280. The throttle control module 280 may generate a desired pulse width modulation (PWM) signal 282 using closed-loop control based on the desired throttle position 267. The throttle actuator module 116 actuates the throttle valve 112 based on the desired PWM signal 282. More specifically, the desired PWM signal 282 may drive (e.g., a motor of) the throttle actuator module 116 to actuate the throttle valve 112. While the desired PWM signal 282 is shown and discussed, the throttle control module 280 may control the throttle actuator module 116 using another suitable type of signal.

The air control module 228 may output the desired MAP 266 to the boost scheduling module 248. The boost scheduling module 248 uses the desired MAP 266 to control the boost actuator module 165. The boost actuator module 165 then controls one or more turbochargers (e.g., the turbocharger including the turbine 160-1 and the compressor 160-2) and/or superchargers.

The air control module 228 determines the desired APC 268 based on the air torque request 265. For example only, the torque relationship can also be inverted to solve for the desired APC 268. For a given torque request ($T_{Des}$), the desired APC 268 ($APC_{Des}$) may be determined based on:

$$APC_{Des} = T^{-1}(T_{Des}, S, I, E, AF, OT, \#) \qquad (2)$$

where S is spark timing, I is intake valve timing, E is exhaust valve timing, AF is air/fuel ratio, OT is oil temperature, and # is a number of cylinders that are to be active. Additional variables may also be accounted for, such as the degree of opening of an exhaust gas recirculation (EGR) valve. This relationship may be embodied as an equation and/or as a lookup table. The spark timing (S), the intake and exhaust valve timings (I) and (E), and the air/fuel ratio (AF) may be the actual values as reported by the spark control module 232, the valve control module 252, and the fuel control module 240.

The valve control module 252 determines a desired intake valve timing 290 for a next cylinder in a predetermined firing order of the cylinders as a function of the desired APC 268. The function may be embodied as an equation and/or as a lookup table. Additionally or alternatively, the valve control module 252 may determine the desired intake valve timing 290 for the next cylinder in the predetermined firing order of the cylinders a function of a desired amount of trapped residual exhaust gas. The valve control module 252 also determines a desired exhaust valve timing 292. The valve control module 252 may determine the desired exhaust valve timing 292 as a function of the desired APC 268.

A valve timing may include to an open timing (e.g., in crank angle degrees, CAD) of a valve (e.g., an intake valve or an exhaust valve) and a closing timing of the valve (e.g., in CAD). The period between (defined by) the opening and closing timings may be referred to as valve duration. In other words, duration of a valve of a cylinder may refer to the period that the valve is open for a combustion event of the cylinder.

A deactivation control module 294 selectively issues a command 296 to deactivate one or more cylinders of the engine 102. The deactivation control module 294 may command deactivation of one or more cylinders and re-activation of deactivated cylinders, for example, based on the driver torque request 253, the vehicle speed 255, and/or one or more other suitable parameters.

The deactivation control module 294 may command deactivation of one or more cylinders, for example, when the driver torque request 253 can be satisfied with the one or more cylinders deactivated. The deactivation control module 294 may command deactivation of one or more cylinders, for example, to reduce fuel consumption and/or for one or more other suitable purposes. The deactivation control module 294 may command deactivation of a predefined group of cylinders (e.g., half) of the cylinders of the engine 102. When a cylinder is deactivated, its intake and exhaust valves are maintained closed and provision of fuel and spark to the cylinder is disabled.

The valve control module 252 deactivates the intake and exhaust valves of the one or more cylinders of the engine 102 in response to the command 296. The fuel control module 240 disables fuel to the one or more cylinders of the engine 102 in response to the command 296. The spark control module 232 may disable spark to the one or more cylinders of the engine 102 in response to the command 296.

As described above, the desired APC 268 is a function of the number of active cylinders. The number of active cylinders decreases in response to the command 296 to deactivate one or more cylinders. The desired APC 268 increases as the number of active cylinders decreases (i.e., the number of cylinders that are to be deactivated increases), and vice versa. This is because less cylinders will be used to produce a given torque request.

In response to the increase in the desired APC 268 that occurs in response to the command 296, the valve control module 252 adjusts the desired intake valve timing 290 for the non-deactivated cylinders. This allows the non-deactivated cylinders to achieve a given torque request by increasing intake valve duration of the non-deactivated cylinders. Increasing intake valve duration of a given cylinder may be performed by advancing the opening timing of the intake valve while maintaining the closing timing of the intake valve or in another suitable manner. Increasing intake valve duration of the non-deactivated cylinders may enable the spark timing of the non-deactivated cylinders to be maintained at the calibrated spark timing during the transition and while the one or more cylinders are deactivated. The valve control module 252 may also adjust the desired exhaust valve timing 292 for the non-deactivated cylinders in response to the increase in the desired APC 268 that occurs in response to the command 296.

Control of the intake and exhaust valve actuators of the engine 102 that may be performed when deactivating one or more cylinders will be discussed in conjunction with FIG. 3. Control of the intake and exhaust valve actuators of the engine that may be performed during and after re-activation of one or more cylinders will be discussed in conjunction with FIGS. 4A-4B.

Figure 3:
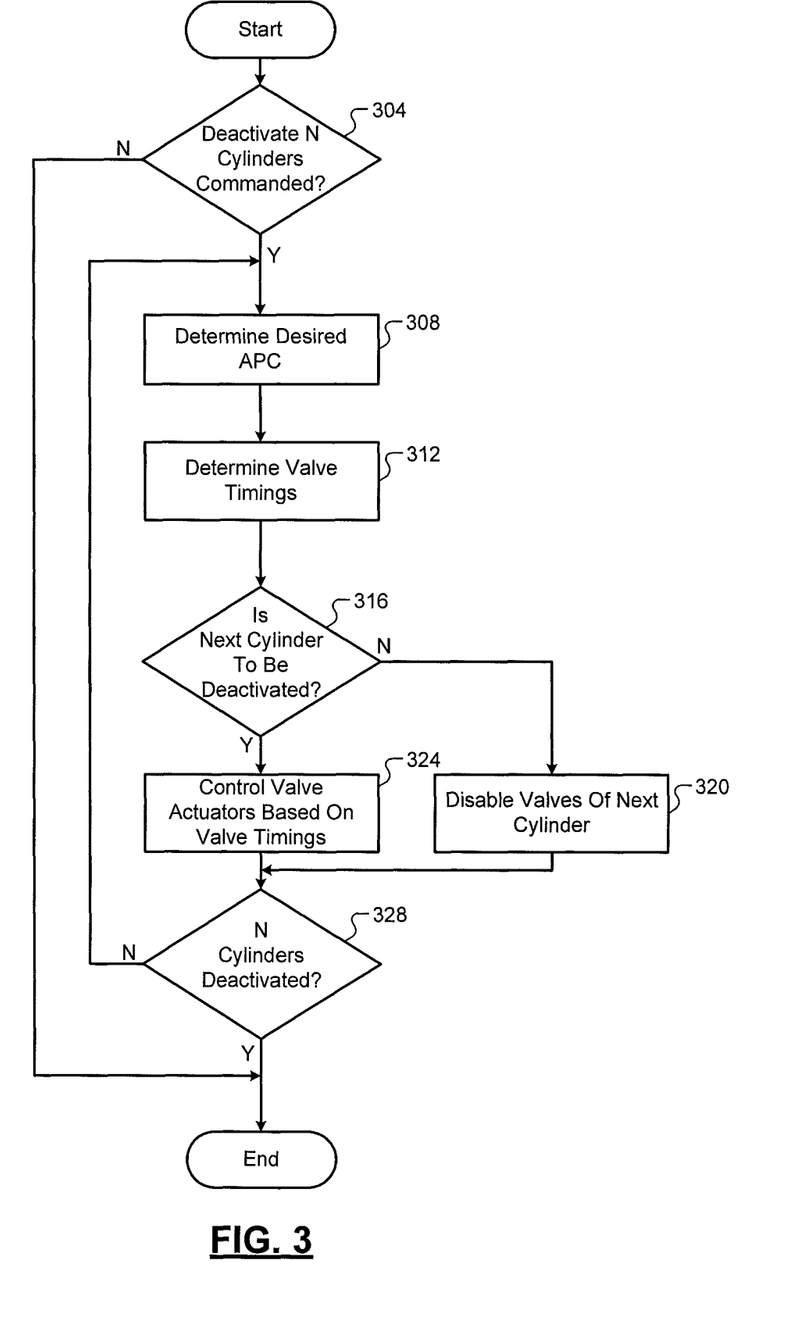
FIG. 3 is a flowchart depicting an example method of controlling valve timing during deactivation of one or more cylinders according to the present disclosure.

Referring now to FIG. 3, a flowchart depicting an example method that may be performed by the ECM 114 of controlling valve timing during deactivation of one or more cylinders is presented. At 304, the air control module 228 determines whether deactivation of one or more cylinders of the engine 102 has been commanded. If true, control continues with 308. If false, control may end.

At 308, the air control module 228 determines the desired APC 268 as a function of the air torque request 265 and the number of cylinders that are to remain active. As described above, the desired APC 268 increases as the number of cylinders that are to remain active decreases and vice versa. At 312, the valve control module 252 determines the desired intake valve timing 290 for a next cylinder in the firing order as a function of the desired APC 268. Control may also determine the desired exhaust valve timing 292 as a function of the desired APC 268. Control continues with 316.

At 316, the valve control module 252 determines whether the next cylinder in the firing order is one of the one or more cylinders that are to be deactivated. If true, the valve control module 252 deactivates the intake and exhaust valve actuators of the next cylinder in the firing order at 320, and control continues with 328. Provision of fuel to the next cylinder is also disabled when the next cylinder in the firing order is one of the one or more cylinders that are to be deactivated. If false, the valve control module 252 controls the intake and exhaust valve actuators of the next cylinder in the firing order based on the desired intake and exhaust valve timings 290 and 292, respectively, at 324, and control continues with 328.

At 328, the valve control module 252 determines whether each of the one or more cylinders have been deactivated. If true, control may end. If false, control may return to 308. In this manner, the valve control module 252 disables the valves of the one or more cylinders that are to be deactivated, and the valve control module 252 increases the intake valve duration of the cylinders that remain active to achieve the desired APC 268 and the air torque request 265. The valve control module 252 may also adjust opening of the exhaust valves (e.g., timing and/or duration) of the cylinders that remain active to achieve the desired APC 268 and the air torque request 265. While control is shown and discussed as ending, FIG. 3 may be illustrative of one control loop and control may return to 304.

Figure 4A:
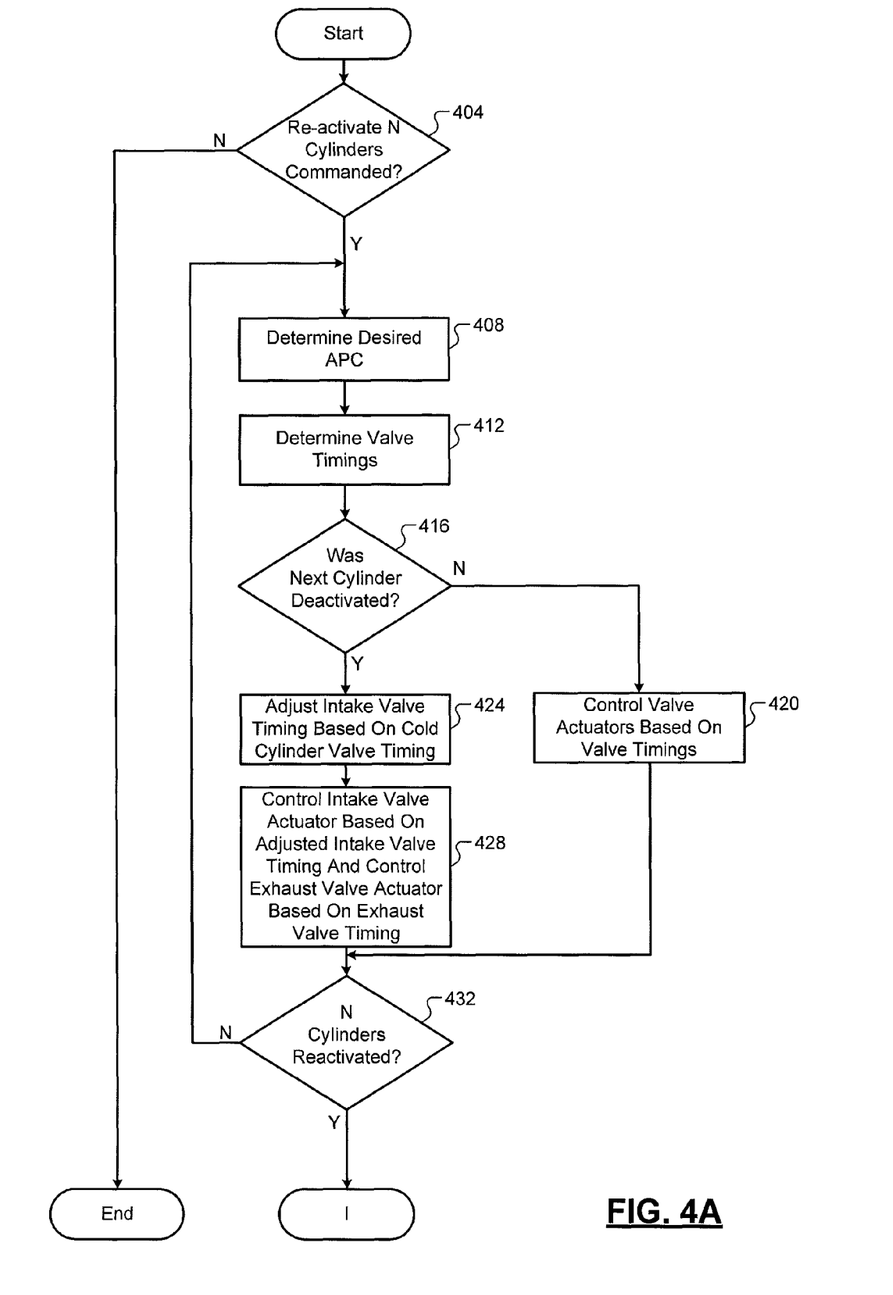
FIGS. 4A-4B include a flowchart depicting an example method of controlling valve timing during and after re-activation of one or more cylinders according to the present disclosure.
Figure 4B:
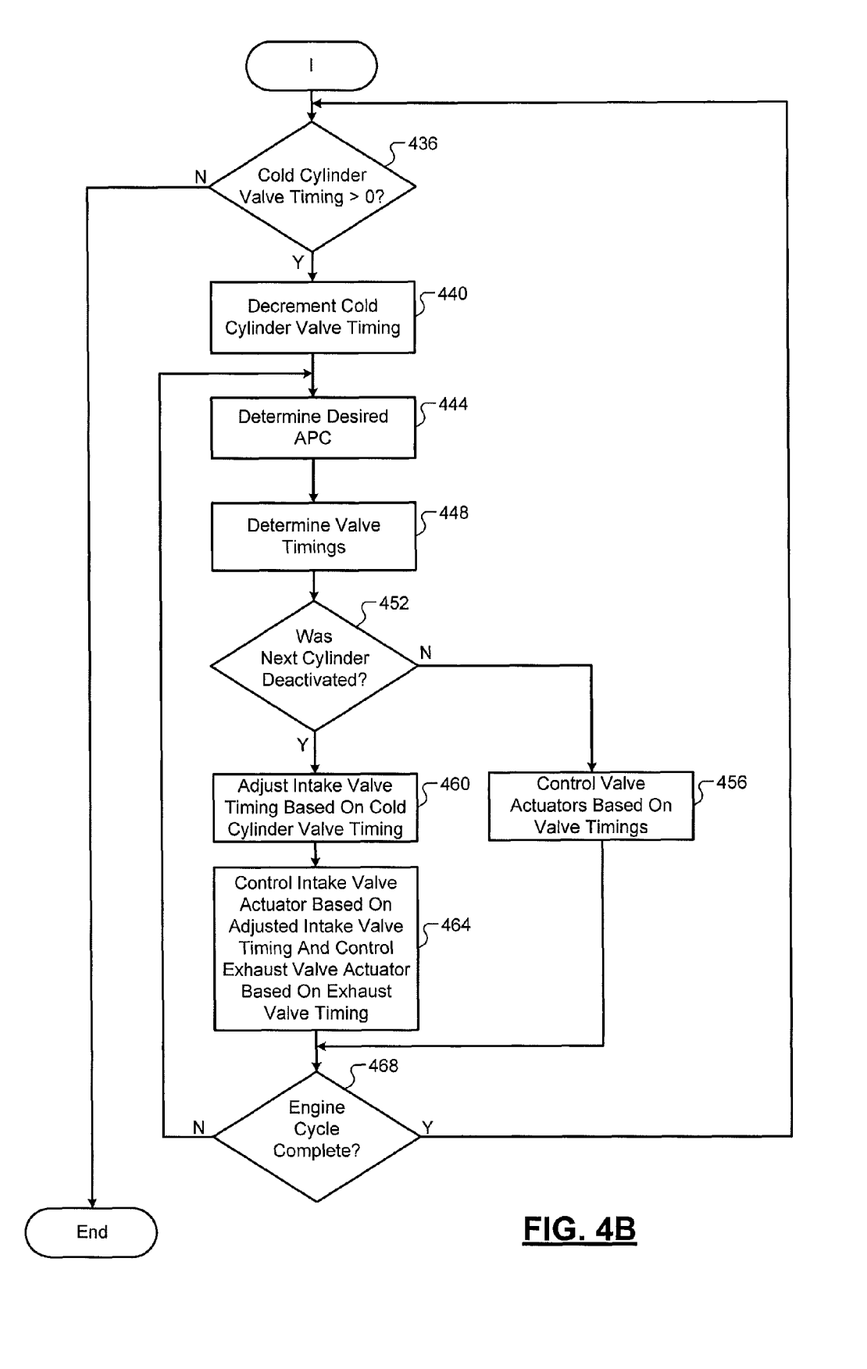

Referring now to FIG. 4A-4B, a flowchart depicting an example method that may be performed by the ECM 114 of controlling valve timing during and after re-activation of one or more cylinders is presented. Control may begin with 404 (FIG. 4A) where the air control module 228 determines whether re-activation of one or more cylinders of the engine 102 has been commanded. If true, control continues with 408. If false, control may end.

At 408, the air control module 228 determines the desired APC 268 as a function of the air torque request 265 and the number of cylinders that will be active once the one or more cylinders are re-activated. At 412, the valve control module 252 determines the desired intake valve timing 290 for a next cylinder in the firing order as a function of the desired APC 268. The valve control module 252 may also determine the desired exhaust valve timing 292 for the next cylinder in the firing order as a function of the desired APC 268. Control continues with 416.

At 416, the valve control module 252 determines whether the next cylinder in the firing order is one of the one or more cylinders that was deactivated (i.e., being transitioned from deactivated to active). If false, the valve control module 252 controls the intake and exhaust valve actuators of the next cylinder in the firing order at 420 based on the desired intake and exhaust valve timings 290 and 292, respectively, and control continues with 432. If true, control continues with 424.

The valve control module 252 may adjust the desired intake valve timing 290 based on a cold cylinder timing (e.g., in CAD) at 424. More specifically, the valve control module 252 adjusts the desired intake valve timing 290 to increase intake valve duration based on the cold cylinder timing at 424. Control may, for example, advance the intake valve opening timing according to the cold cylinder timing at 424. The valve control module 252 may also adjust the desired exhaust valve timing 292 at 424. The valve control module 252 may adjust the desired exhaust valve timing 292 based on the cold cylinder timing or a second (different) cold cylinder timing (e.g., in CAD). Control continues with 428. At 428, the valve control module 252 controls the intake and exhaust valve actuators of the next cylinder in the firing order based on the adjusted versions of the desired intake and exhaust valve timings 290 and 292. Control may continue with 432.

Cylinders that are re-activated after being deactivated may exhibit poorer combustion characteristics (e.g., torque production) than cylinders that were active while one or more cylinders (that are being re-activated) were deactivated. Cylinders that are re-activated after being deactivated may exhibit poorer combustion characteristics for a number of engine cycles after the re-activation. Adjusting the desired intake valve timing 290 based on the cold cylinder timing may increase the APC of the cylinders that are re-activated to offset the poorer combustion characteristics that those cylinders may exhibit. As discussed below, the cold cylinder valve timing(s) may be initialized to a predetermined value and adjusted toward zero as time passes after all of the one or more cylinders have been re-activated. Adjusting the cold cylinder valve timing(s) toward zero allows the desired intake valve timing 290 to be adjusted less as time passes and the combustion characteristics of the re-activated cylinders improve.

In various implementations, instead of adjusting the desired intake valve timing 290 based on the cold cylinder timing, the air control module 228 may increase the desired APC 268 for cylinders that are to be re-activated. The air control module 228 may increase the desired APC 268 based on a predetermined amount (e.g., mass in grams) that may be reduced to zero over time after re-activation. In such implementations, the valve control module 252 may determine the desired intake and exhaust valve timings 290 and 292 for cylinders that are to be re-activated based on the increased version of the desired APC 268. For cylinders that were already active, the valve control module 252 may determine the desired intake and exhaust valve timings 290 and 292 based on the (non-increased) desired APC 268.

At 432, the valve control module 252 determines whether each of the one or more cylinders have been re-activated. If true, control may proceed with 436 (FIG. 4B). If false, control may return to 408. At 436, the valve control module may determine whether the cold cylinder valve timing is greater than zero. If true, control may continue with 440. If false, control may end.

At 440, the valve control module 252 may adjust (e.g., decrease) the cold cylinder valve timing toward zero. For example, the valve control module 252 may decrement the cold cylinder valve timing by a predetermined amount (e.g., in CAD) at 440. Control continues with 444.

At 444, the air control module 228 determines the desired APC 268 as a function of the air torque request 265 and the number of cylinders that that are active. At 448, the valve control module 252 determines the desired intake valve timing 290 for a next cylinder in the firing order as a function of the desired APC 268. The valve control module 252 may also determine the desired exhaust valve timing 292 for the next cylinder in the firing order as a function of the desired APC 268. Control continues with 452.

At 452, the valve control module 252 determines whether the next cylinder in the firing order is one of the one or more cylinders that was previously deactivated (i.e., transitioned from deactivated to active in response to the re-activation command). If false, the valve control module 252 controls the intake and exhaust valve actuators of the next cylinder in the firing order at 456 based on the desired intake and exhaust valve timings 290 and 292, respectively, and control continues with 468. If true, control continues with 460.

The valve control module 252 may adjust the desired intake valve timing 290 based on the cold cylinder timing at 460. Control may, for example, advance the intake valve opening timing according to the cold cylinder timing at 460.

The valve control module 252 may also adjust the desired exhaust valve timing 292 at 460. Control continues with 464.

At 464, the valve control module 252 controls the intake and exhaust valve actuators of the next cylinder in the firing order based on the adjusted versions of the desired intake and exhaust valve timings 290 and 292. Control may continue with 468. At 468, control may determine whether an engine cycle (e.g., 720 CAD) has been completed. If true, control may return to 436. If false, control may return to 444. In this manner, control may continue to decrease the cold cylinder valve timing, engine cycle by engine cycle, as the combustion characteristics of the re-activated cylinders improve.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An engine control system comprising:
    an air control module that determines a desired mass of air per cylinder (APC) based on a torque request and that selectively increases the desired APC in response to a command to deactivate N cylinders of an engine; and
    a valve control module that disables intake and exhaust valves of the N cylinders of the engine in response to the command, that determines intake and exhaust valve timing based on the desired APC, that controls camless intake and exhaust valve actuators of M other cylinders based on the intake and exhaust valve timing, respectively, and that increases intake valve duration of the M other cylinders as the desired APC increases,
    wherein the engine includes Q cylinders, M and N are integers greater than zero, and M plus N equals Q.

2. The engine control system of claim 1 wherein the air control module determines the desired APC as a function of the torque request and a number of active cylinders of the engine.

3. The engine control system of claim 1 wherein the valve control module determines the intake and exhaust valve timing as a function of the desired APC.

4. The engine control system of claim 1 further comprising a fuel control module that disables fuel to the N cylinders in response to the command.

5. The engine control system of claim 1 wherein:
    the air control module selectively decreases the desired APC in response to a command to re-activate the N cylinders; and
    the valve control module determines intake and exhaust valve timing for the N cylinders based on the desired APC, adjusts the intake valve timing for the N cylinders based on a predetermined value in response to the command to re-activate the N cylinders, and controls the camless intake valve actuators of the N cylinders based on the adjusted intake valve timing.

6. The engine control system of claim 5 wherein the valve control module selectively decreases the predetermined value after the command to re-activate the N cylinders.

7. The engine control system of claim 6 wherein the valve control module decrements the predetermined value in response to completion of an engine cycle after the command to re-activate the N cylinders.

8. The engine control system of claim 5 wherein the valve control module advances an intake valve opening timing for the N cylinders based on the predetermined value in response to the command to re-activate the N cylinders.

9. The engine control system of claim 5 wherein the valve control module increases intake valve duration for the N cylinders based on the predetermined value in response to the command to re-activate the N cylinders, and
    wherein the valve control module does not increase intake valve duration for the M other cylinders in response to the command to re-activate the N cylinders.

10. An engine control method comprising:
    determining a desired mass of air per cylinder (ARC) based on a torque request;
    selectively increasing the desired APC in response to a command to deactivate N cylinders of an engine;
    disabling intake and exhaust valves of the N cylinders of the engine in response to the command;
    determining intake and exhaust valve timing based on the desired APC;
    controlling camless intake and exhaust valve actuators of M other cylinders based on the intake and exhaust valve timing, respectively; and
    increasing intake valve duration of the M other cylinders as the desired APC increases,
    wherein the engine includes Q cylinders, M and N are integers greater than zero, and M plus N equals Q.

11. The engine control method of claim 10 further comprising determining the desired APC as a function of the torque request and a number of active cylinders of the engine.

12. The engine control method of claim 10 further comprising determining the intake and exhaust valve timing as a function of the desired APC.

13. The engine control method of claim 10 further comprising disabling fuel to the N cylinders in response to the command.

14. The engine control method of claim 10 further comprising:
- selectively decreasing the desired APC in response to a command to re-activate the N cylinders;
- determining intake and exhaust valve timing for the N cylinders based on the desired APC;
- adjusting the intake valve timing for the N cylinders based on a predetermined value in response to the command to re-activate the N cylinders; and
- controlling the camless intake valve actuators of the N cylinders based on the adjusted intake valve timing.

15. The engine control method of claim 14 further comprising selectively decreasing the predetermined value after the command to re-activate the N cylinders.

16. The engine control method of claim 15 further comprising decrementing the predetermined value in response to completion of an engine cycle after the command to re-activate the N cylinders.

17. The engine control method of claim 14 further comprising advancing an intake valve opening timing for the N cylinders based on the predetermined value in response to the command to re-activate the N cylinders.

18. The engine control method of claim 14 further comprising:
- increasing intake valve duration for the N cylinders based on the predetermined value in response to the command to re-activate the N cylinders; and
- one of maintaining and decreasing intake valve duration for the M other cylinders in response to the command to re-activate the N cylinders.

\* \* \* \* \*